United States Patent

[11] 3,576,107

[72] Inventor Shigeo Nakanishi
    Berea, Ohio
[21] Appl. No. 804,172
[22] Filed Mar. 4, 1969
[45] Patented Apr. 27, 1971
[73] Assignee The United States of America as represented
    by the Administrator of the National
    Aeronautic and Space Administration

[54] PROPELLANT FEED ISOLATOR
    8 Claims, 1 Drawing Fig.
[52] U.S. Cl.................................................. 60/202,
                                                 313/63, 315/111
[51] Int. Cl..................................................... F03h 1/00,
                                                            F05h 1/16

[50] Field of Search............................................ 60/202;
                                                        313/63; 315/111

[56]             References Cited
            UNITED STATES PATENTS
3,515,932  6/1970  King............................. 315/111
2,950,410  8/1960  Lemmers et al. ............. 313/109
3,138,919  6/1964  Deutsch........................ 60/202
3,159,967 12/1964  Webb............................ 60/202
3,336,748  8/1967  Nakanishi et al. ............ 60/202

Primary Examiner—Mark M. Newman
Attorneys—N. T. Musial, G. E. Shook and G. T. McCoy ABSTRACT: An internal labyrinth and shield structure improves the electrical isolation of a propellant feed source from an ion thrustor.

PATENTED APR 27 1971   3,576,107
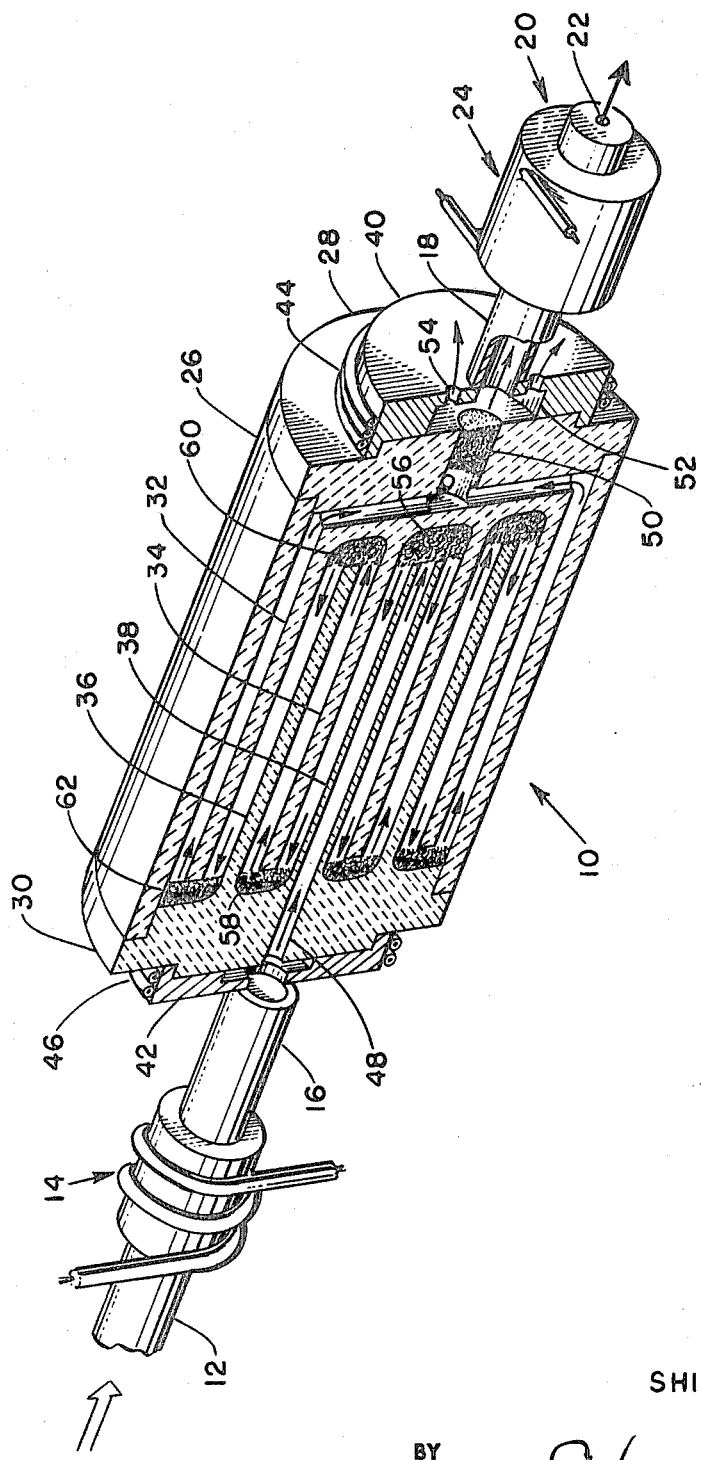
INVENTOR
SHIGEO NAKANISHI
BY
ATTORNEYS

PROPELLANT FEED ISOLATOR

ORIGIN OF THE INVENTION

The invention described herein was made by an employee of the United States Government and may be manufactured and used by or for the Government of governmental purposes without the payment of any royalties thereon or therefor.

BACKGROUND OF THE INVENTION

This invention is concerned with improving the propellant feed system of an ion thrustor. The invention is directed to electrically isolating the propellant feed source from the ion thrustor.

Propellant feed pressures in the 1 torr to 10 torr range are presently used in ion thrustors. Problems have been encountered in attempting to provide the necessary high voltage isolation required at these pressure levels within the dimensional limitations imposed by the thrustor system.

Electrical isolation has been achieved by flowing the propellant vapor through an electrically nonconductive tube from the source to the ionization chamber of the ion thrustor. Such a device is designed for low pressure operation. For example, satisfactory results have been obtained from an isolator described in U.S. Pat. No. 3,336,748 when it is operated in a propellant flow pressure range of $10^{13}$ torr to $10^{11}$ torr. However, problems have been encountered when this device is operated at the higher propellant feed pressures required by present thrustor systems.

SUMMARY OF THE INVENTION

These problems have been solved with an isolator constructed in accordance with the invention in which a heated ceramic tube provides a duct for the propellant. Labyrinth structures within the heated tube reverse the flow direction of the propellant to increase the effective flow passage length. This increases the wall surface area to promote surface deionization of charged particles.

OBJECTS OF THE INVENTION

It is, therefore, an object of the present invention to improve the feed system of an ion thrustor by providing an isolator which operates with higher propellant feed pressures.

Another object of the invention is to provide a propellant feed isolator to operate at pressures in the 1 torr to 10 torr range.

A further object of the invention is to provide a high voltage isolator in which localized discharges of charged particles are shielded or confined.

These and other objects of the invention will be apparent from the specification which follows and from the drawing.

DESCRIPTION OF THE DRAWING

The FIGURE is a perspective view of a portion of a propellant feed system of an ion thrustor and includes a longitudinal sectional view through the propellant feed isolator.

DESCRIPTION OF THE PREFERRED EMBODIMENT

Referring now to the drawing there is shown a simplified perspective view of a plasma thrustor feed system having an isolator 10 constructed in accordance with the present invention. The system includes a feed tube 12 having one end connected to a source of liquid propellant such as mercury.

A vaporizer 14 surrounds the propellant feed tube 12 and serves to vaporize the liquid propellant. It is contemplated that the feed tube 12 could be connected to a source of gaseous propellant which would eliminate the need for the vaporizer 14. The gaseous propellant passes from the vaporizer 14 through a tube 16 into the isolator 10.

After passing through the isolator 10 in a manner which will be described later in greater detail the gaseous propellant passes through a tube 18 to a hollow cathode 20. The propellant discharges through an aperture 22 in the hollow cathode 20 and passes into the ionization chamber of the ion thrustor. A cathode made of 0.32 cm. diameter tantalum tubing with a 0.1 cm. thick disc of 2 percent thoriated tungsten welded on the end has been satisfactory. A nominally 0.02 cm. diameter hole in the disc formed the cathode aperture 22.

A heater 24 surrounds the cathode 20. A tungsten rhenium wire coil encapsulated in flame-sprayed alumina and radiation shielded with layers of tantalum foil has been satisfactory for the heater 24.

The isolator 10 includes an outer tube 26 of a ceramic material such as aluminum oxide that is heated above the condensation temperature of the propellant. The tube 26 forms the outer structure of a labyrinth duct for the heated propellant.

Boron nitride endpieces 28 and 30 are mounted at the extremities of the tube 26. A pair of concentric cylinders 32 and 34 are formed on the endpiece 28. Mating cylinders 36 and 38 are formed on the endpiece 30.

The endpiece 28 has a shoulder formed on its surface opposite the cylinders 32 and 34. This shoulder mates with a recess in a flange 40 on the tube 18. A cylindrical shoulder on the endpiece 30 mates with a recess in a flange 42 on the tube 16.

A suitable heater coil 44 is mounted on the flange 40. A similar coil 46 is mounted on the flange 42. These coils heat the isolator 10 by conduction.

Gaseous propellant from the tube 16 is introduced into a drilled passage 48 in the cylinder 38. The gaseous propellant flows from the passage 48 into the annular spaces between the cylinders as shown in the drawing. The flow is reversed in direction four times before being discharged radially into a collecting passage 50. A chamber 52 in the flange 40 receives propellant from the collecting passage 50.

The flow of propellant from the chamber 52 is proportioned to discharge from metering orifices 54 into the thrustor ionization chamber. The remainder of the propellant passes through the tube 18 to the hollow cathode 20.

A tungsten wool pad 56 is positioned at the end of the passage 48 while a similar pad 58 is positioned at the opposite end of the isolator at the rim of the cylinder 34. A pad 60 engages the end of the cylinder 36 while a similar pad 62 is at the end of the cylinder 32. These tungsten wool pads have a high surface to volume ratio which further enhances the recombination of charged particles.

Although a preferred embodiment of the invention has been described it is contemplated that various structural modifications may be made without departing from the spirit of the invention or the scope of the subjoined claims. By way of example the number of tungsten wool pads may be increased. These pads may be located in the passages between the cylinders. Also a pad may be located in the collecting passage 50.

The actual number of passages as well as the positioning and number of pads is determined by the governing parameter, $pd$, in the Paschen curve which defines breakdown thresholds. The existence of a minimum in the Paschen curve indicates that for a given configuration or effective path length a pressure exists at which the value of $pd$ corresponds to the minimum breakdown voltage. Because the minimum breakdown voltage may be lower than the desired operating voltage, the enhanced deionization effects of additional surfaces is helpful in preventing breakdowns at the pressures corresponding to the $pd$ for the minimum breakdown voltage.

I claim:

1. In a propellant feed system for an ion thrustor having an ionization chamber and a source of gaseous propellant, an electrical isolator comprising:

an elongated hollow member of electrically insulating material having one end in communication with said propellant source and the opposite end in communication with the ionization chamber for forming a flow passage for conducting said gaseous propellant from said source to said ionization chamber, and a plurality of spaced cylinders of electrically insulating material positioned in said elongated hollow member for increasing the effective flow passage length thereof while increasing the wall surface area thereby promoting surface deionization of the gaseous propellant, the space between said cylinders forming a labyrinth of annular passages for conducting said gaseous propellant and reversing the flow thereof through said hollow elongated member.

2. Apparatus as claimed in claim 1 including a plurality of spaced cylinders of boron nitride positioned in said elongated hollow member.

3. Apparatus as claimed in claim 2 including at least one steel wool pad located within said labyrinth structure.

4. Apparatus as claimed in claim 2 including means for heating said cylinders and said elongated hollow member.

5. Apparatus as claimed in claim 1 including a source of liquid mercury propellant, and means for vaporizing said propellant prior to entry into said elongated hollow member.

6. Apparatus as claimed in claim 5 including a cathode in the ionization chamber, said cathode having a passage extending therethrough for receiving gaseous mercury from said elongated hollow member.

7. Apparatus as claimed in claim 6 including means for heating said cathode.

8. Apparatus as claimed in claim 6 including:

a chamber for receiving mercury vapor from said elongated hollow member and supplying the same to said cathode, and metering means for discharging a portion of said mercury vapor into said ionization chamber.